United States Patent [19]

Dougherty

[11] Patent Number: 5,295,037
[45] Date of Patent: Mar. 15, 1994

[54] MOLDED CASE CIRCUIT BREAKER-PROCESS LOOP UNIT

[75] Inventor: John J. Dougherty, Avon, Conn.

[73] Assignee: General Electric Company, New York, N.Y.

[21] Appl. No.: 826,505

[22] Filed: Jan. 27, 1992

[51] Int. Cl.⁵ .............................................. H02H 3/24
[52] U.S. Cl. ......................................... 361/93; 361/94
[58] Field of Search ............................... 361/90, 93, 97

[56] References Cited

U.S. PATENT DOCUMENTS

| | | | |
|---|---|---|---|
| 4,461,987 | 7/1984 | Fulton et al. | 318/800 |
| 4,589,052 | 5/1986 | Dougherty | 361/94 |
| 4,641,117 | 2/1987 | Willard | 335/7 |
| 4,679,019 | 7/1987 | Todaro et al. | 335/172 |
| 4,700,161 | 10/1987 | Todaro et al. | 335/172 |
| 4,728,914 | 3/1988 | Morris et al. | 335/6 |
| 4,754,247 | 6/1988 | Raymont et al. | 335/202 |
| 4,794,356 | 12/1988 | Yu et al. | 335/13 |
| 4,806,893 | 2/1989 | Castonguay et al. | 335/20 |
| 4,890,184 | 12/1989 | Russell | 361/87 |
| 4,967,304 | 10/1990 | Dougherty | 361/31 |
| 4,999,730 | 3/1991 | Pickard | 361/90 |

Primary Examiner—Todd Deboer
Attorney, Agent, or Firm—Richard A. Menelly

[57] ABSTRACT

An integrated protection unit is a circuit breaker which includes basic overcurrent protection facility along with selective electrical accessories. A molded plastic accessory access cover secured to the integrated protection unit cover protects the accessory components contained within the integrated protection unit cover from the environment. A combined overcurrent trip actuator and accessory unit is either field-installed or factory-installed within the integrated protection unit. One such actuator-accessory responds to a process current loop signal upon command to interrupt circuit current to associated electrical equipment.

19 Claims, 6 Drawing Sheets

MOLDED CASE CIRCUIT BREAKER-PROCESS LOOP UNIT

BACKGROUND OF THE INVENTION

The trend in the circuit protection industry is currently toward complete circuit protection which is accomplished by the addition of supplemental protection apparatus to standard overcurrent protective devices, such as molded case circuit breakers. U.S. Pat. No. 4,754,247 entitled "Molded Case Circuit Breaker Accessory Enclosure" describes a plurality of accessories that can be field-installed within a circuit breaker without interfering with the integrity of the circuit breaker internal components. This is accomplished by mounting the accessories within a recess formed in the circuit breaker enclosure cover.

An electronic trip actuator which is mounted within the circuit breaker enclosure is described within U.S. Pat. No. 4,679,019 entitled "Trip Actuator for Molded Case Circuit Breakers". The circuit breaker actuator responds to trip signals generated by an electronic trip unit completely contained within a semi-conductor chip such as that described within U.S. Pat. No. 4,589,052. The development of a combined trip actuator for both overcurrent protection as well as accessory function is found within U.S. Pat. No. 4,700,161 entitled "Combined Trip Unit and Accessory Module for Electronic Trip Circuit Breakers". The aforementioned U.S. Patents accordingly represent the advanced state of the art of circuit protection devices.

A more recent example of a combined overcurrent trip actuator and multiple accessory unit is described within U.S. Pat. No. 4,890,184 entitled "Molded Case Circuit Breaker Actuator-Accessory Unit" which combined overcurrent trip actuator and multiple accessory unit also houses the printed wire board that carries the accessory control circuit.

U.S. Pat. No. 4,967,304 describes an electronic circuit interrupter which includes a microprocessor programmed for tailored overcurrent protection to industrial power systems containing a plurality of electric motors as well as motor protective relays or process loops.

In a manufacturing process, various electrical equipment are controlled by means of a process loop DC current usually ranging from 4 to 20 milliamperes. The process loop current is noise-free and transfers through long lengths of wire conductors with minimum losses. To control associated electrical equipment by selective start and stop procedures, the associated electric circuit breakers are turned ON and OFF by means of the process loop current logic.

It would be economically advantageous to incorporate process control logic within the associated circuit breakers to turn the circuit breakers ON and OFF in response to the process loop current without requiring additional process loop current electronics.

One purpose of this invention is to describe a molded case circuit breaker having the capability to detect overcurrent conditions for standard electric circuit protection along with the additional capability of responding to process loop current signals to turn the circuit breakers OFF and ON in response to process control function.

SUMMARY OF THE INVENTION

A combined molded case circuit breaker-process loop control unit includes overcurrent protection along with auxiliary accessory function within a common enclosure. An accessory cover provides access to selected accessories to allow both factory and field-installation of the accessories. A circuit breaker trip actuator-process loop control unit provides circuit overcurrent protection by operation of the circuit breaker trip circuit along with process loop operation.

DESCRIPTION OF THE PREFERRED EMBODIMENT

Figure 1:
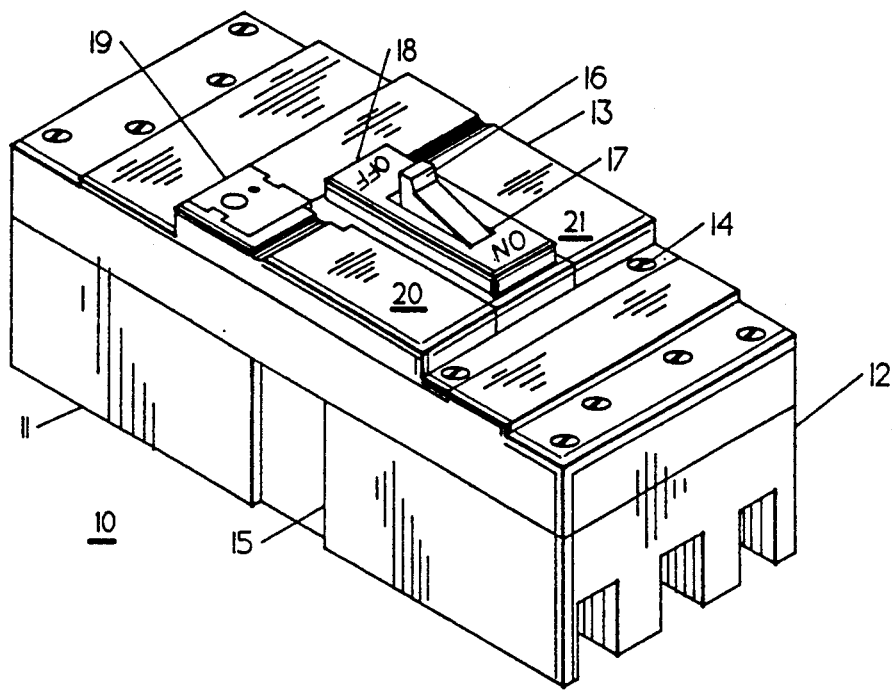
FIG. 1 is a top perspective view of a combined molded case circuit breaker-process loop control unit according to the invention.

A combined molded case circuit breaker-process loop control unit 10 consisting of a molded plastic case 11 with a molded plastic cover 12 is shown in FIG. 1 with the accessory cover 13 attached to the circuit breaker cover by means of screws 14. The case includes a wiring slot 15 formed therein for allowing external connection with a remote electric motor as well as a remote indicator or alarm unit. The circuit breaker operating handle 16 extends up from an access slot 17 formed in the cover escutcheon 18. A rating plug 19 such as described in U.S. Pat. No. 4,728,914 entitled "Rating Plug Enclosure for Molded Case Circuit Breakers", is shown assembled within the accessory cover. A pair of accessory doors 20, 21 are formed in the accessory cover for providing access to the combined overcurrent trip actuator and process loop accessory unit 22, hereafter "trip actuator process loop accessory" contained within the recess 23, shown in FIG. 2. Still referring to FIG. 2, the rating plug 19 is fitted within a recess 24 formed in the accessory cover 13 after the accessory cover is fastened to the circuit breaker cover by means of screws 14, thru-holes 25 and threaded openings 26. Access to the rating plug interior for calibration purposes is made by means of the rating plug access hole 27. The trip unit for the circuit breaker-process loop 10 is contained within a printed wire board 28 which is positioned in the trip unit recess 29. The rating plug 19 when inserted within the rating plug recess interconnects with the printed wire board by means of pins 30 upstanding from the printed wire board and sockets 31 formed on the bottom of the rating plug. An auxiliary switch 32 is positioned within the auxiliary switch recess 33 and is similar to that described in aforementioned U.S. Pat. No. 4,794,356 entitled "Molded Case Circuit Breaker Auxiliary Switch Unit". When the auxiliary switch and trip unit printed wire board have been assembled within their appropriate recesses, the trip actuator-process loop accessory 22 is then installed within recess 23. The trip actuator-process loop accessory includes a housing 34 within which the trip coil 35 is enclosed and which further contains a plunger 36 and a plunger spring (not shown) which projects the plunger in a forward trip position against the holding force provided by the trip coil 35. The trip actuator-process loop accessory is similar to that described within aforementioned U.S. Pat. No. 4,806,893 wherein a trip actuator latch 37 is pivotally attached to the housing 34. A hook 38 formed at one end of the trip actuator latch cooperates with the circuit breaker operating mechanism as described in aforementioned U.S. Pat. No. 4,700,161. The operation of an actuator-accessory unit for both overcurrent and accessory function operation is described within U.S. Pat. Nos. 4,641,117 and 4,679,019. The trip actuator-process loop accessory of the invention includes a printed wire board 39 which contains the components required for operating the trip coil 35 and is connected with a pair of pins 40 upstanding from the trip unit printed wire board 28 by means of connectors 41 which are connected to the trip actuator-process loop accessory printed wire board 39. A pair of wire conductors 42 connect the trip actuator-process loop accessory unit with a voltage source when undervoltage protection is desired and a separate pair of wire conductors 43 connect the trip actuator-process loop accessory with an electric motor for process loop function. The trip coil 35 internally connects with the trip actuator-process loop accessory printed wire board 39 by means of a separate pair of wire conductors 44, 48 as indicated.

Before discussing the process loop circuits contained within the printed wire board 39 located within the trip actuator-process loop accessory 22, it is helpful to review the arrangement of a "process loop" as a means for monitoring process controls in industrial applications. In typical industrial applications, a control element with a DC power supply generates a four to twenty milliamp signal which corresponds to some process parameter such as temperature in a motor or fluid level in a tank. The current loop is employed because a current source overcomes the impedance problems of long distance wiring. In one typical application, the current in the process loop is continuously converted to voltage and compared to a reference value and the electric current to the motor is interrupted by means of a protective relay device when the current in the loop exceeds the reference value. U.S. Pat. No. 4,461,987 entitled "Current Sensing Circuit for Motor Controls" describes one such process control circuit wherein an impedance network utilizes a capacitor to produce a voltage signal that is proportional to the steady-state component of the loop current and an inductance to produce a voltage proportional to the transient component of the loop current.

Figure 2:
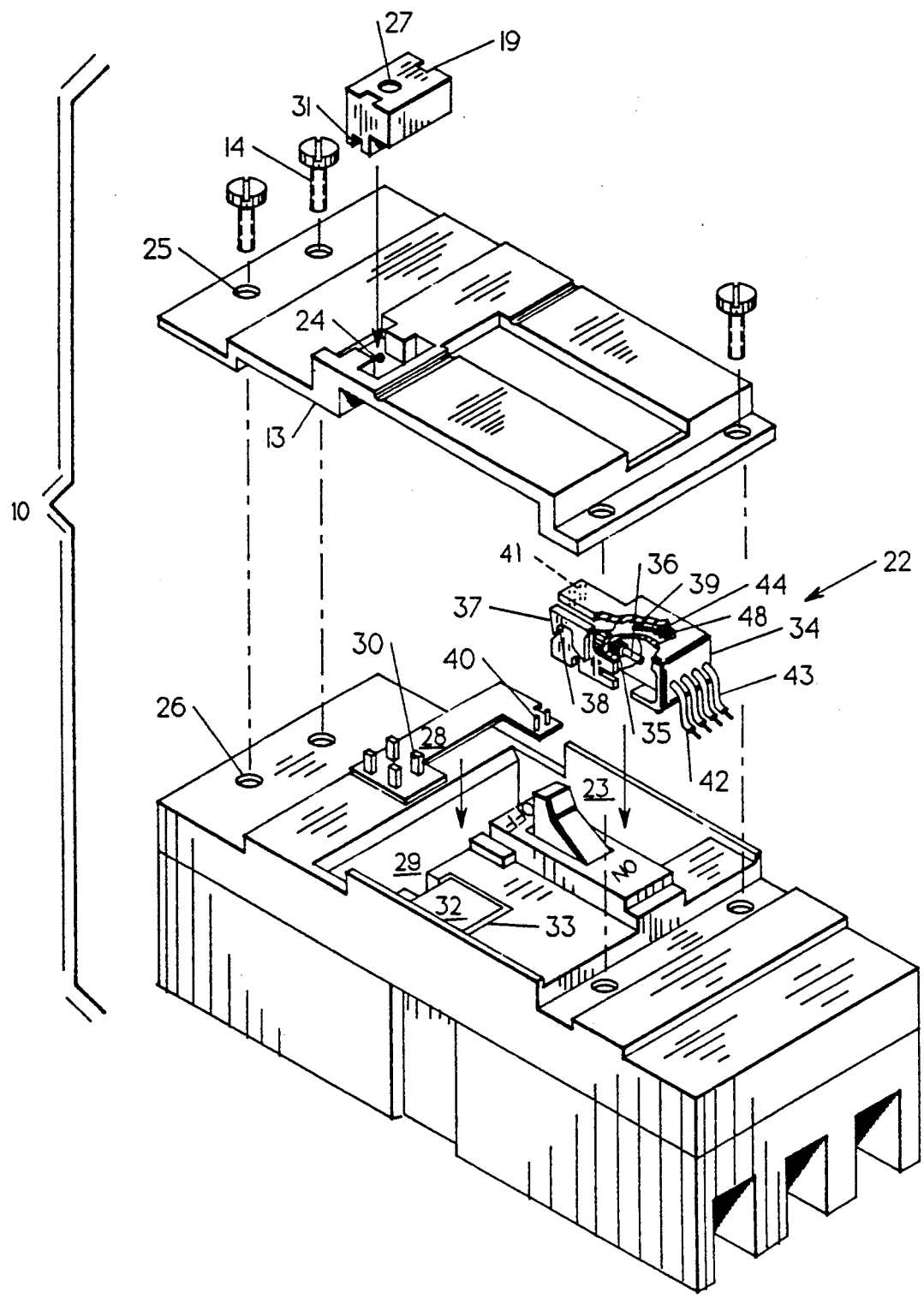
FIG. 2 is an exploded top perspective view of the circuit breaker-process loop control unit of FIG. 1 prior to assembly of the combined trip actuator-process loop accessory unit in further accordance to the invention.
Figure 3:
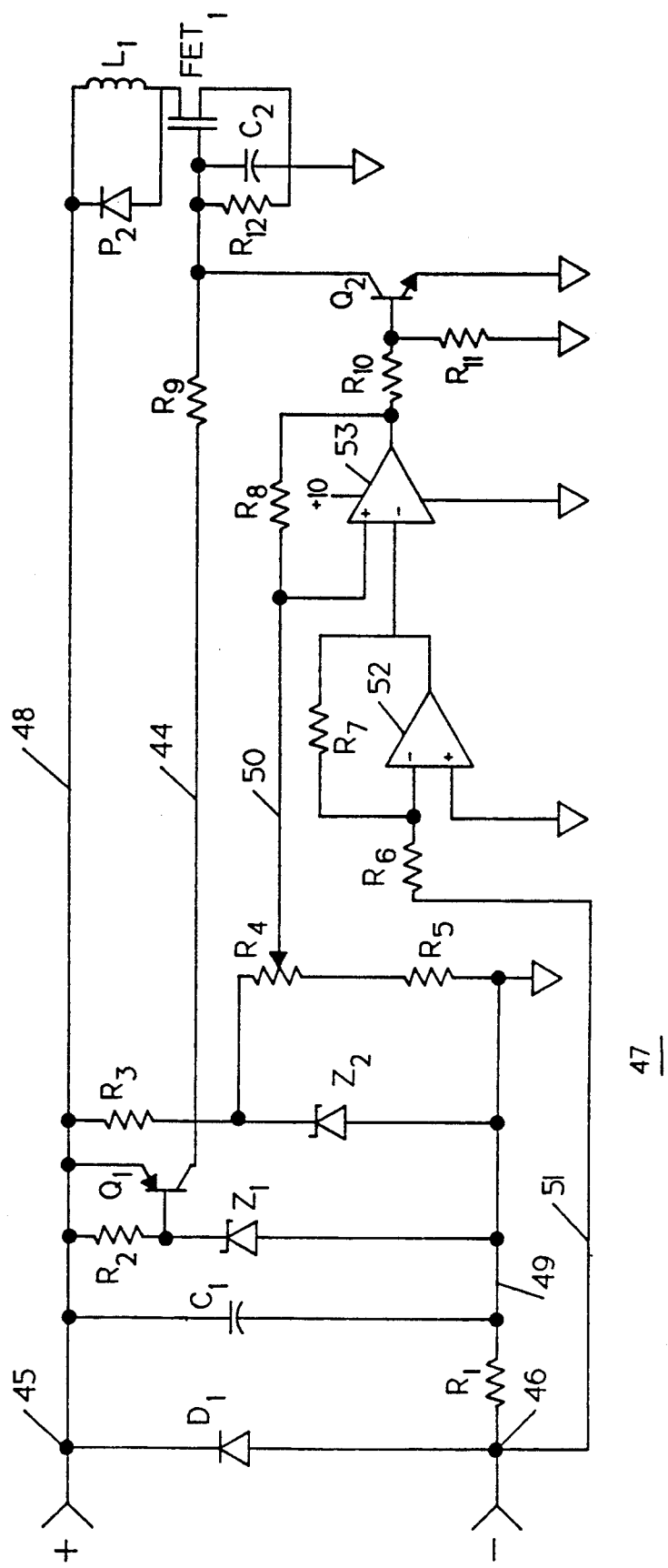
FIG. 3 is a circuit diagram of one process loop circuit used with the trip actuator-process loop accessory unit of FIG. 2.

A process loop sensing circuit according to the invention is depicted at 47, in FIG. 3 and is contained within the printed wire board 39 (FIG. 2) wherein the process loop current is connected to a pair of input terminals 45, 46 connecting with the positive and negative rails 48, 49 of the printed wire board. The process loop current charges capacitor $C_1$ through diode $D_1$ and burden resistor $R_1$ to a predetermined value set by the first zener diode $Z_1$. $Z_1$ begins to conduct and turns ON transistor switch $Q_1$ when the voltage across $C_1$ reaches 10 volts, for example, by conduction between resistor $R_2$ and the base of $Q_1$. $Q_1$ in turn activates the FET connected with the base of $Q_1$ through the current limiting resistor $R_9$ to transfer operational current through the diode $D_2$ and the inductance $L_1$ which comprises the trip winding 35 within the trip actuator-process loop accessory 22 depicted earlier in FIG. 2. Referring to both FIGS. 2 and 3, it is noted that external connection with the terminals 45, 46 of the process loop circuit 47 of FIG. 3 is made by means of the external conductors 43. Electrical connection with the trip coil 35 is made by means of conductors 44, 48 shown in both FIGS. 2 and 3. The loop current inputted to terminals 45, 46 is converted to a voltage signal appearing across $R_1$ which is compared to a reference voltage developed across resistor $R_3$ and a second zener diode $Z_2$, which reference voltage is adjusted through resistors $R_4$, $R_5$. The voltage signal is applied to the negative input of a first operational amplifier 52 via conductor 51 and resistor $R_6$. The output of the first operational amplifier is connected back with the negative input through a feedback resistor $R_7$ as well as to the negative input of a second operational amplifier 53. The positive input to the second operational amplifier is connected with resistor $R_4$ over conductor 50 and the output of the second operational amplifier is connected to its positive input through feedback resistor $R_8$ to provide switching hysteresis. The output of the second operational amplifier is connected to the base of a second transistor switch $Q_2$ through bias resistor $R_{10}$ which is coupled to ground through resistor $R_{11}$. The collector of the second transistor which also functions as an electronic switch connects with the gate of the FET. Transistor switch $Q_2$ is normally "ON", shunting the current from $Q_1$ away from the gate of the FET, holding it OFF. When the reference voltage from 22, $R_4$ and $R_5$ is exceeded on the signal from the first op amp 52, the second op amp 53 switches to a low state, turning off $Q_2$ and allowing the FET to turn on, tripping the breaker through actuator coil (L). The combination of $Q_1$ turned on by $Z_1$ and the combination of resistor $R_{12}$ and capacitor $C_2$ provide the turn on gate voltage for the FET. This combination ensures sufficient tripping voltage on capacitor $C_1$ and a short delay during loop initialization.

Figure 4:
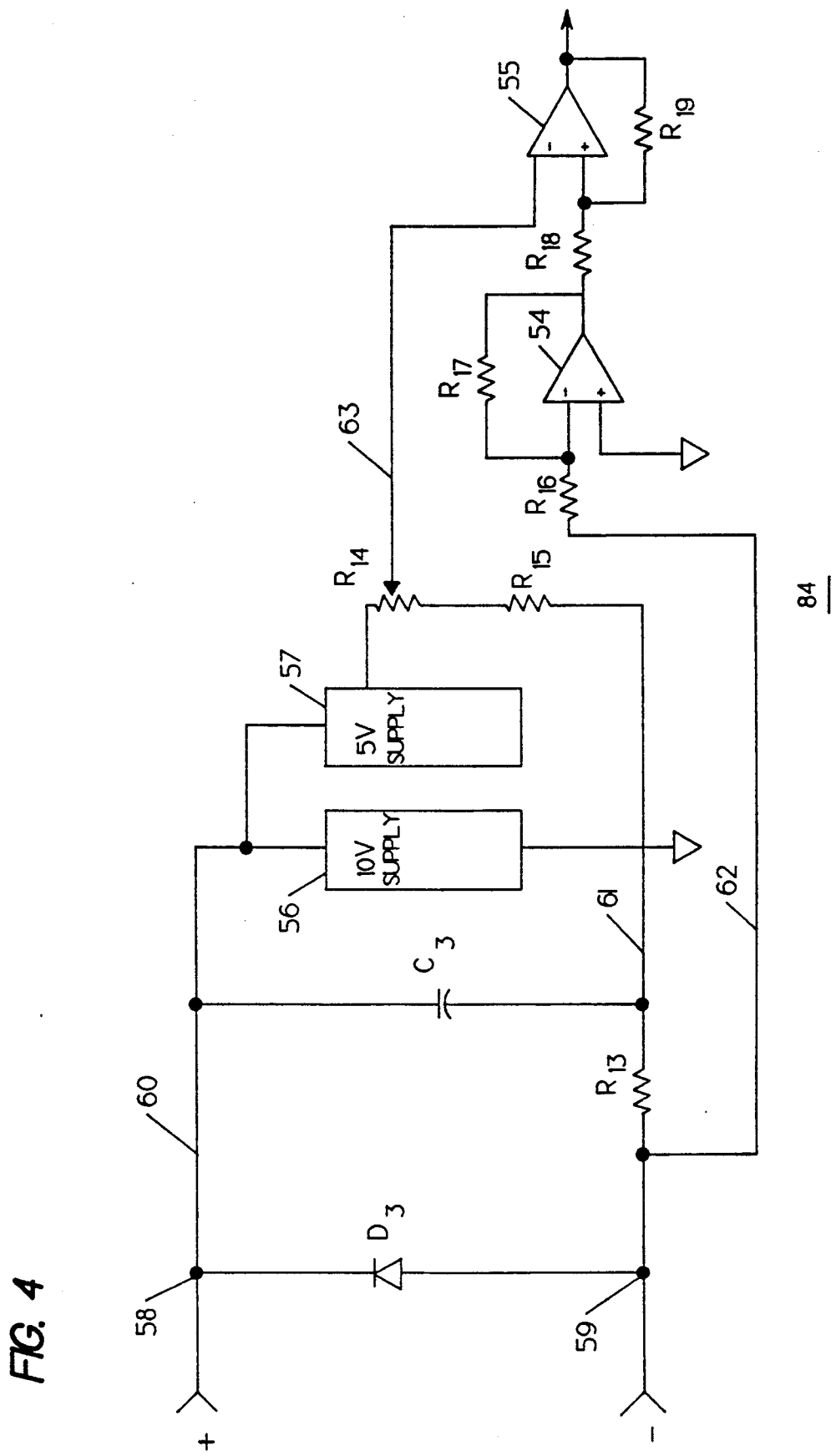
FIG. 4 is a circuit diagram of an alternate process loop circuit.

The process loop circuit 84 depicted in FIG. 4 operates in reverse to that depicted earlier in FIG. 3 such that a trip signal is provided to the trip coil 35 within the trip actuator-process loop accessory 22 of FIG. 2 when the current in the current loop is less than a predetermined range of values. The current loop is applied to the input terminals 58, 59 and a reference voltage is developed across the parallel combination of diode $D_3$ and storage capacitor $C_3$ that are arranged across the positive and negative rails 60, 61. The current through the burden resistor $R_{13}$ develops a voltage signal in proportion to the current flowing through the current loop. A 10 volt DC supply 56 and a 5 volt DC supply 57 are commonly connected across positive and negative rails 60, 61 and the reference voltage is adjusted by means of the voltage divider consisting of resistors $R_{14}$, $R_{15}$. The reference voltage is applied to the negative input of a first operational amplifier 55 over conductor 63 as indicated. The voltage signal developed across burden resistor $R_{13}$ in proportion to the loop current is connected via conductor 62 and resistor $R_{16}$ to the negative input of a second operational amplifier 54. The output of the second operational amplifier is connected back to the negative input through a feedback resistor $R_{17}$ and to the positive input of the first operational amplifier 55 through a current limiting resistor $R_{18}$. The output of the first operational amplifier is connected back to its positive input through a feedback resistor $R_{19}$ to provide switching hysteresis, and is connected to a transistor switch similar to that depicted earlier in FIG. 3. When the current in the current loop falls below a predetermined range such as often occurs when the motor is designed for operating at a predetermined speed, the current to the motor is accordingly interrupted.

The process control circuit 85 depicted in FIG. 5 performs both of the process control functions described earlier for the circuits of FIGS. 3 and 4 by providing an operational window whereby the loop current is compared to a range of predetermined reference values and operates to interrupt the current when the loop current falls below or exceeds the predetermined reference values. The loop current is applied to a pair of input terminals 67, 68 connected with the positive and negative rails 69, 75 of the process loop circuit. A similar diode $D_4$ and capacitor $C_4$ are connected across the terminals to develop a reference voltage for comparison to the voltage signal generated across the burden resistor $R_{20}$ in proportion to the loop current. The resistor $R_{21}$ and zener diode $Z_2$ provide base current to the transistor switch $Q_3$ when the voltage signal exceeds the reference voltage generated across the combination of resistor $R_{22}$ and zener diode $Z_3$. $Q_3$ then becomes conductive to provide a current flow through conductor 70 to $FET_2$ through resistor $R_{29}$ and the parallel combination of resistors $R_{31}$ and capacitor $C_5$. Transistor $Q_5$ shunts the current away from the gate of the $FET_2$ when turned On, when $Q_5$ is turned OFF the current flow through conductor 70 operates the $FET_2$. The operation of $FET_2$ in turn provides operational power to the inductor $L_2$ and diode $D_5$ to operate the trip actuator-process loop accessory 22 of FIG. 2 to interrupt the circuit current flow to the protected system in the manner described earlier. Transistor $Q_5$ is turned OFF and the circuit current is interrupted only when the loop current is less than or greater than the predetermined range defined by the voltage divider resistors $R_{23}$, $R_{24}$ and $R_{25}$, $R_{26}$ which provide input to the pair of first and second operational amplifiers 65, 66 over conductors 71, 72 and current limiting resistor $R_{33}$ as indicated. The voltage signal representative of the loop current is applied to the negative input of a third operational amplifier 64 via conductor 95 and current limiting resistor $R_{27}$. The output of the third operational amplifier 64 is connected to its negative input by means of the feedback resistor $R_{28}$. The output of the third operational amplifier 64 is connected to the positive input of a first operational amplifier 65 through resistor $R_{32}$ and to the negative input of the second operational amplifier 66. The output of the second operational amplifier 66 is connected back to its positive input by means of the feedback resistor $R_{38}$ and the output of the operational amplifier 66 is connected to its input by means of the feedback resistor $R_{34}$. The output of the first and second operational amplifiers 65, 66 are connected through resistors $R_{35}$, $R_{36}$ to the base of the switching transistor $Q_4$. The emitter of switching transistor $Q_4$ connects to ground. The collector of the switching transistor $Q_4$ is connected to the junction between the base of the switching transistor $Q_5$ and through the bias resistor $R_{30}$ to the positive rail 69 over conductor 73. Accordingly, when the voltage signal appearing across the burden resistor $R_{20}$ is outside of the reference range transistor $Q_4$ turns ON and in turn switches transistor $Q_5$ to its OFF state to allow current to flow to the $FET_2$ gate circuit which connects via resistor $R_{31}$ and capacitor $C_5$ to the inductance coil $L_2$ and diode $D_5$ to interrupt circuit current via the trip actuator-process loop unit 22 of FIG. 2 in the manner described earlier.

Figure 5:
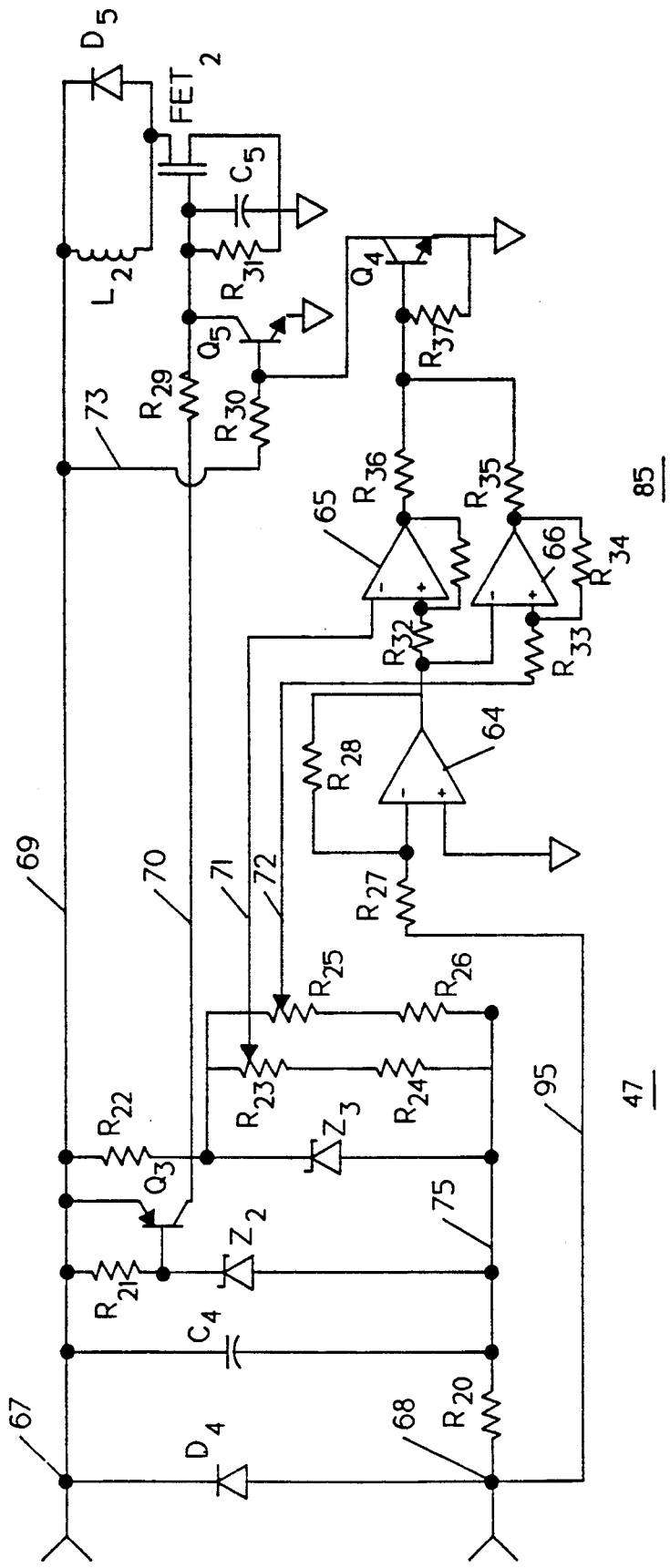
FIG. 5 is a circuit diagram of a further alternate process loop circuit.

It is seen that the process loop circuit 85 of FIG. 5 functions similar to the maximum and minimum circuits depicted earlier in FIGS. 3 and 4 to provide a full range of control function between maximum and minimum operational limits. The "window" hereby determined permits operation of the process element supplied by the circuit breaker when the process variable represented by the loop circuit remains in a defined range.

Figure 6:
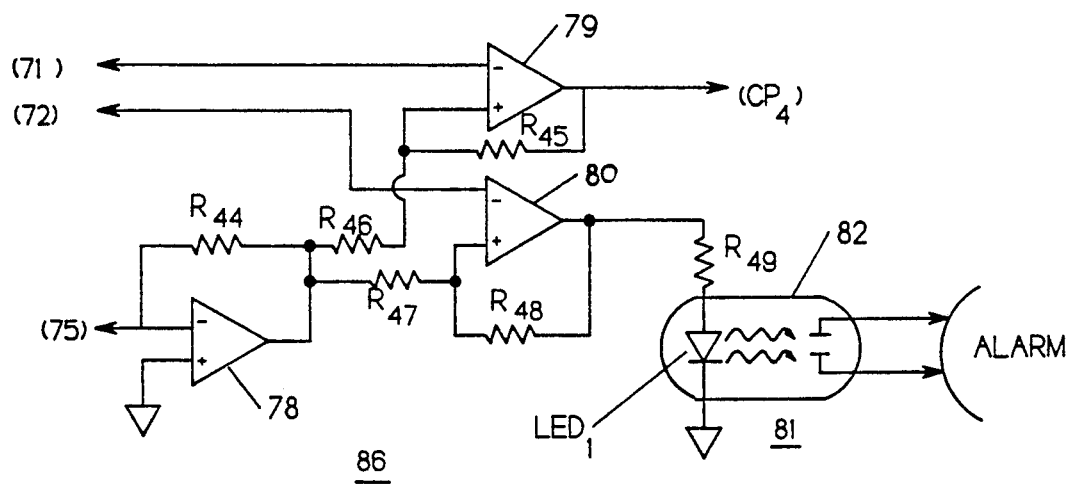
FIG. 6 is a circuit diagram of a process loop circuit containing a warning relay.

The process loop circuit 86 depicted in FIG. 6 is a variation of that depicted at 85 in FIG. 5 and includes a warning relay 81 as indicated. The first operational amplifier 78 receives input from conductor 75 and the second and third operational amplifiers 79, 80 receive input from the conductors 71, 72 respectively as depicted earlier in FIG. 5. The output of the second operational amplifier 79 connects with a similar switching resistor $Q_4$ and with the negative input of the first operational amplifier 78 through resistors $R_{44}$, $R_{45}$ and $R_{46}$. The output of first operational amplifier 78 connects with the positive input to the second operational amplifier 79 and, to the positive input of the third operational amplifier 80 through the resistor $R_{47}$. Resistor $R_{48}$ is connected in a feedback loop between the output of the third operational amplifier 80 to its positive input and connects through resistor $R_{49}$ to the warning relay 81 which includes an $LED_1$ and a pair of contacts 82. The contacts 82 in turn connect with an audible alarm either at the motor or at the combined circuit breaker-process loop if so desired. When the amplitude of negative current drawn from the first operational amplifier 78, over conductor 75 is greater than a predetermined value, the current to the motor is interrupted by means of the second operational amplifiers 79 while the third operational amplifier 80 provides visible and audible indication that such breaker interruption has occurred.

Figure 7:
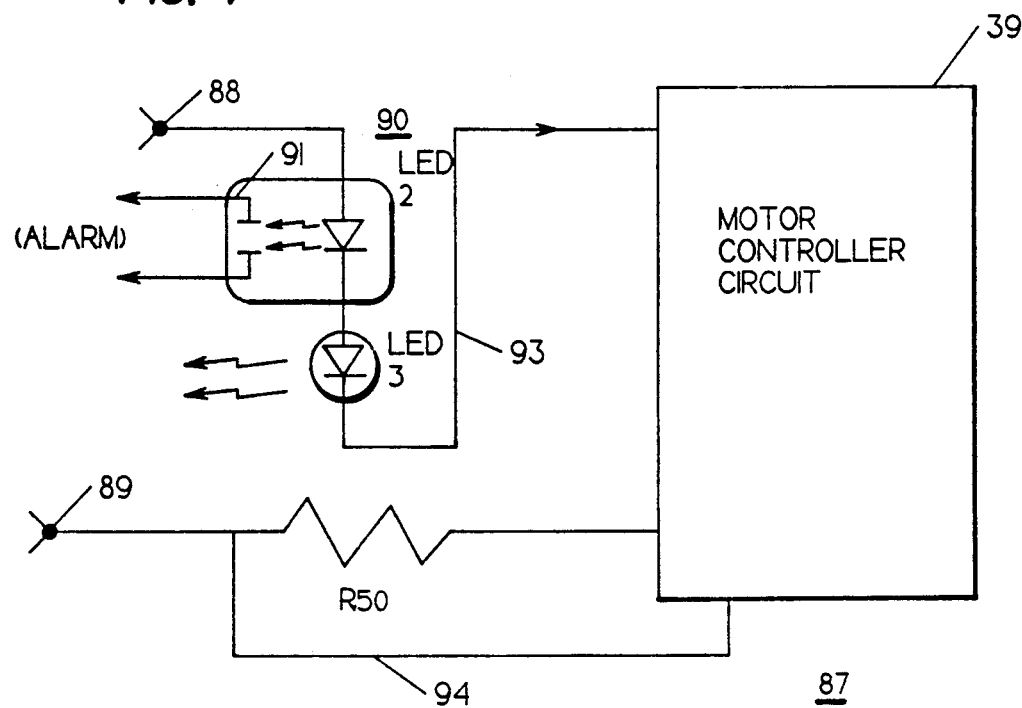
FIG. 7 is a diagrammatic representation of a further process loop circuit containing a warning relay.

A simplified process loop circuit 87 is depicted in FIG. 7 within the printed wire board 39 contained within the motor trip actuator-process loop unit 22 (FIG. 2) and wherein the warning relay 90 is connected in series with one input terminal 88 over a first conductor 93. The other input terminal 89 is connected with the printed wire board by means of a current limiting resistor $R_{50}$ over a second conductor 94, as indicated. Since the warning relay is in series with the loop current through conductor 93, $LED_2$ and $LED_3$ are "ON" when the loop current is present. A remote audible alarm becomes actuated by means of the contacts 91 in the event that the loop current is interrupted. An observer in the vicinity of the circuit breaker-process loop unit would observe that the breaker is operational by means of the $LED_3$ while a remote observer would learn of the succession of the motor by means of the audible alarm signal.

A combined circuit breaker-process loop control unit has herein been described in the form of an electronic trip circuit breaker which includes a trip actuator-process loop accessory unit. The loop current in the process loop circuit is sensed within the circuit interrupter-process loop and current to the associated electrical equipment is interrupted when the circuit current exceeds or falls below a predetermined range of values. Warning relays are optionally connected with the circuit breaker-process loop for indication to an observer both at the location of the equipment and the circuit breaker-process loop control unit as to the operating condition of the associated electric equipment.

Having thus described my invention, what I claim as new and desire to secure by Letters Patent is:

1. A combined circuit breaker-process loop controller unit comprising:
    a circuit breaker cover attached to a circuit breaker case;
    an accessory cover attached to said circuit breaker cover over a recess formed within said circuit breaker cover;
    a pair of contacts within said circuit breaker case controlled by an operating mechanism within said circuit breaker case for manual and automatic separation;
    a trip unit within said cover activating said operating mechanism upon occurrence of an overcurrent condition within an associated electric circuit; and
    a trip actuator-process loop control unit within said recess connecting with remote electric equipment activating said operating mechanism to interrupt supply current to said equipment, said trip actuator-process loop control unit including a trip coil interacting with said operating mechanism to place said operating mechanism in both active and inactive conditions.

2. The circuit breaker-process loop controller unit of claim 1 wherein said trip actuator-process unit includes a process control circuit adapted for receiving a process control loop current.

3. The circuit breaker-process loop controller unit of claim 2 wherein said process control circuit comprises a printed wire board including a pair of positive and negative supply rails.

4. The circuit breaker-process loop controller unit of claim 3 including a storage capacitor connecting between said positive and negative rails.

5. The circuit breaker-process loop controller unit of claim 4 including a zener diode connecting with said positive and negative rails providing a reference voltage for said storage capacitor.

6. The circuit breaker-process loop controller unit of claim 5 including a burden resistor connected in series within said positive or negative rail providing a signal voltage proportional to said loop current.

7. The circuit breaker-process loop controller unit of claim 2 including means actuating said trip coil to activate said operating mechanism when said process control loop current is less than a predetermined range of values.

8. The circuit breaker-process loop controller unit of claim 7 including means indicating when said loop current is less than or greater than said predetermined range.

9. The circuit breaker-process loop controller unit of claim 8 wherein said indicating means comprises a relay.

10. The circuit breaker-process loop controller unit of claim 7 wherein said means actuating said trip coil comprises pair of first and second operational amplifiers having an input connecting with said burden resistor and an output, connecting with a first electronic switch.

11. The circuit breaker-process loop controller unit of claim 10 including a second electronic switch in circuit with said burden resistor activating said trip coil when said loop current is greater than said predetermined range.

12. The circuit breaker-process loop controller unit of claim 10 wherein said first electronic switch comprises a first transistor.

13. The circuit breaker-process loop controller unit or claim 11 wherein said second electronic switch comprises a second transistor.

14. The circuit breaker-process loop controller unit of claim 13 wherein said first and second transistors connect with said trip coil through a FET.

15. A trip actuator-process loop controller unit comprising:
    a trip coil arranged for interacting with a circuit breaker operating mechanism placing said operating mechanism in active and inactive conditions; and
    a process loop circuit connecting with said trip coil and a remote process element whereby electric current in a loop circuit is responsive to a process parameter and is compared to reference values within said process loop circuit to determine when said electric current exceeds or is less than said reference values.

16. The trip actuator-process loop controller unit of claim 15 wherein said trip coil is energized to interrupt said electric current to said motor when said electric current exceeds said reference values.

17. The trip actuator-process loop controller unit of claim 15 wherein said trip coil is energized to interrupt said electric current to said motor wherein said electric current is less than said reference values.

18. The trip actuator-process loop controller unit of claim 15 including relay means connected with said circuit providing audible or visible indication when said circuit current is interrupted.

19. The trip actuator-process loop controller unit of claim 15 including a printed wire board attached to said trip coil said process loop circuit being contained within said printed wire board.

* * * * *